(12) United States Patent
Chen et al.

(10) Patent No.: US 12,386,914 B1
(45) Date of Patent: Aug. 12, 2025

(54) CONSTRUCTION METHOD OF INTELLIGENT INTERACTION SERVICE SYSTEM, WEBSITE INTELLIGENT INTERACTION METHOD AND DEVICE

(71) Applicants: COSMO INSTITUTE OF INDUSTRIAL INTELLIGENCE (QINGDAO) CO., LTD., Qingdao (CN); COSMOPlat IoT Technology Co., Ltd., Qingdao (CN)

(72) Inventors: Lucheng Chen, Qingdao (CN); Xiaoping Lu, Qingdao (CN); Zongkui Yan, Qingdao (CN); Yong Wang, Qingdao (CN); Zhenfa Yang, Qingdao (CN); Jian Yang, Qingdao (CN); Mizhen Wang, Qingdao (CN); Pengjing Wang, Qingdao (CN)

(73) Assignees: COSMO INSTITUTE OF INDUSTRIAL INTELLIGENCE (QINGDAO) CO., LTD. (CN); COSMOPlat IoT Technology, Co., Ltd (CN)

( * ) Notice: Subject to any disclaimer, the term of this patent is extended or adjusted under 35 U.S.C. 154(b) by 0 days.

(21) Appl. No.: 19/073,842

(22) Filed: Mar. 7, 2025

(30) Foreign Application Priority Data

Jul. 9, 2024 (CN) .......................... 202410911098.X

(51) Int. Cl.
*G06F 17/00* (2019.01)
*G06F 16/951* (2019.01)
(Continued)

(52) U.S. Cl.
CPC .......... *G06F 16/958* (2019.01); *G06F 16/951* (2019.01); *G06F 40/30* (2020.01)

(58) Field of Classification Search
CPC ....... G06F 16/958; G06F 16/951; G06F 40/30
See application file for complete search history.

(56) References Cited

U.S. PATENT DOCUMENTS 9,858,925 B2 *   1/2018   Gruber .................... G10L 15/18
11,068,554 B2 *  7/2021   Prasad ............. G06F 16/90328
(Continued)

FOREIGN PATENT DOCUMENTS

CN        111400566 A  *  7/2020
CN        113703883 A      11/2021
(Continued)

OTHER PUBLICATIONS

Yang, Wudao, et al, "Information Retrieval and Recommendation Framework based on ChatGPT", 2024 3rd International Conference on Sentiment Analysis and Deep Learning (ICSADL), 2024, pp. 378-385. (Year: 2024).*

(Continued)

*Primary Examiner* — Laurie A Ries
(74) *Attorney, Agent, or Firm* — Quarles & Brady LLP

(57) ABSTRACT

The present application relates to a construction method of an intelligent interaction service system and a website intelligent interaction method and device, which involve, through obtaining a user identity, determining historical multimodal interaction data and a user type that are corresponding to the user identity; obtaining first modal interaction data sent by a user, and determining a user interaction mode according to the historical multimodal interaction data and the first modal interaction data; performing an intent recognition analysis on current interaction data according to an intent recognition component to obtain a user intent label, and transforming the user intent label into a user intent vector; performing a retrieve and match on the user intent vector based on a vector database group to obtain user interaction result information, and sending the user interac- (Continued)

tion result information corresponding to the user type to a human-computer interaction interface in the user interaction mode.

20 Claims, 6 Drawing Sheets

(51) Int. Cl.
*G06F 16/958* (2019.01)
*G06F 40/30* (2020.01)

(56) References Cited

U.S. PATENT DOCUMENTS

| | | | | |
|---|---|---|---|---|
| 11,080,336 | B2* | 8/2021 | Van Dusen | G06Q 50/01 |
| 11,238,118 | B2* | 2/2022 | Murphy | G06F 16/9535 |
| 11,762,929 | B1* | 9/2023 | Meyer | G06F 40/134 |
| | | | | 707/741 |
| 11,775,494 | B2* | 10/2023 | Urdiales | G06N 5/02 |
| | | | | 707/692 |
| 12,174,864 | B1* | 12/2024 | Umrao | G06F 16/90324 |
| 2009/0113288 | A1 | 4/2009 | Thampy et al. | |
| 2013/0332438 | A1* | 12/2013 | Li | G06F 16/24578 |
| | | | | 707/706 |
| 2018/0068031 | A1* | 3/2018 | Hewavitharana | G06F 9/30156 |
| 2020/0294071 | A1* | 9/2020 | Christensen | G06F 16/24578 |
| 2023/0135179 | A1* | 5/2023 | Mielke | G06N 5/022 |
| | | | | 704/232 |
| 2023/0232052 | A1* | 7/2023 | Khavronin | H04N 21/251 |
| | | | | 709/219 |
| 2023/0245651 | A1* | 8/2023 | Wang | G06N 5/022 |
| | | | | 704/275 |
| 2024/0126794 | A1* | 4/2024 | Cook | H04L 51/02 |
| 2024/0281472 | A1* | 8/2024 | LaRhette | G06F 16/248 |
| 2025/0156486 | A1* | 5/2025 | Gupta | G06F 16/9535 |

FOREIGN PATENT DOCUMENTS

| | | | |
|---|---|---|---|
| CN | 114004581 A | 2/2022 | |
| CN | 116541493 A | 8/2023 | |
| CN | 116756178 A | 9/2023 | |
| CN | 116933800 A | 10/2023 | |
| CN | 117540002 A | 2/2024 | |
| CN | 117540028 A | 2/2024 | |
| WO | WO-2019008394 A1 * | 1/2019 | |
| WO | WO-2019027992 A1 * | 2/2019 | G06F 16/9535 |
| WO | WO-2025096650 A1 * | 5/2025 | G06F 16/3329 |

OTHER PUBLICATIONS

"Design of Personalized Network Information Intelligent Retrieval System", China Academic Journal Electronic Publishing House; Apr. 27, 2004; 4 pages.

Notification of Grant of Patent Rights for Inventions for Chinese Application No. 202410911098.X, dated Aug. 14, 2024; 6 pages.

* cited by examiner

# CONSTRUCTION METHOD OF INTELLIGENT INTERACTION SERVICE SYSTEM, WEBSITE INTELLIGENT INTERACTION METHOD AND DEVICE

CROSS-REFERENCE TO RELATED APPLICATIONS

This application claims priority to Chinese Patent Application No. 202410911098.X, filed on Jul. 9, 2024, which is hereby incorporated herein by reference in its entirety.

TECHNICAL FIELD

The present application relates to a field of intelligent interaction, and in particular to a construction method of an intelligent interaction service system and a website intelligent interaction method and device.

BACKGROUND

At present, most official websites of enterprises are used to provide services for users and enable users to understand enterprise services. Methods for a user to obtain an enterprise services includes: Method 1, manually selecting an enterprise service that meets user needs, including 1) manually clicking on by the user a service directory corresponding to his own needs, and 2) extracting a keyword corresponding to the user's input text through a search engine of enterprise website, and searching for an enterprise service corresponding to the keyword on the enterprise website; and Method 2, obtaining by an user an enterprise service that meets his needs through an intelligent interaction service, including 1) interacting by the user with a customer service assistant of an enterprise website through text and extracting a keyword corresponding to the user's input text (the customer service assistant interacts with the user based on a question-and-answer model), and 2) interacting with the enterprise's staff service.

However, among the methods in which the user obtains the enterprise service, the method of manually selecting the enterprise service that meets user needs is low in efficiency, the method of interacting by the user with the customer service assistant is single, and method of interacting by the user with the staff service is high in cost. Therefore, in prior art, there is a lack of understanding of user needs in the way that the user obtains enterprise services, resulting in low matching accuracy of enterprise service and poor user experience.

SUMMARY

The present application provides a construction method of an intelligent interaction service system, and a website intelligent interaction method and device, to solve the problems of low accuracy and poor user experience in user interaction.

In a first aspect, the present application provides a construction method of an intelligent interaction service system, including:
obtaining historical query information of a plurality of websites;
constructing an intent recognition component according to the historical query information of the plurality of websites and a plurality of intent recognition models;
performing an index extraction on the plurality of historical query information according to an index technology to obtain historical query information with an index structure, and constructing an information retrieval component according to the plurality of historical query information and the historical query information with the index structure;
obtaining website data corresponding to a plurality of website addresses, and performing a feature extraction on website data corresponding to each website address, to construct a vector database group;
constructing an intelligent interaction service system according to a user interaction interface, the intent recognition component, the information retrieval component, the vector database group and a generating model.

In an implementation, the constructing the intent recognition component according to the historical query information of the plurality of websites and the plurality of intent recognition models includes:
obtaining website information of the plurality of websites and an intent identification corresponding to each historical query information, where the website information is used to indicate a product and service data corresponding to the websites;
determining intent category and website association information corresponding to each historical query information according to the historical query information of the plurality of websites and the intent identification corresponding to each historical query information;
inputting historical query information with the same complexity level of website information and the intent category and website association information corresponding to each historical query information into an intent recognition model corresponding to the complexity level of website information for training, to obtain a plurality of trained intent recognition models, and using the plurality of trained intent recognition models as the intent recognition component, where different complexity levels of website information correspond to different intent recognition models.

In an implementation, the performing the index extraction on the plurality of historical query information according to the index technology to obtain the historical query information with the index structure, and constructing the information retrieval component according to the plurality of historical query information and the historical query information with the index structure includes:
performing the index extraction on the plurality of historical query information according to the index technology to obtain the historical query information with the index structure;
establishing an association relationship between the historical query information and the historical query information with the index structure;
performing an information retrieval training on the association relationship between the historical query information and the historical query information with the index structure according to a retrieval algorithm, to construct the information retrieval component.

In an implementation, the obtaining the website data corresponding to the plurality of website addresses, and performing the feature extraction on website data corresponding to each website address, to construct the vector database group includes:
obtaining the plurality of website addresses and an access permission of each website address, and crawling website data corresponding to each website address;

filtering first type of website data and second type of website data out from the website data corresponding to each website address, respectively;

determining a website database corresponding to each website address according to the first type of website data corresponding to all website addresses and the second type of website data corresponding to each website address; and performing the feature extraction on the website data corresponding to each website database, respectively, to construct the vector database corresponding to each website address, and determining the vector database group according to a plurality of vector databases corresponding to the plurality of website addresses.

In a second aspect, the present application provides a website intelligent interaction method, including:

obtaining a user identity, and determining historical multimodal interaction data and a user type that are corresponding to the user identity;

obtaining first modal interaction data sent by the user, and determining a user interaction mode according to the historical multimodal interaction data and the first modal interaction data, where the first modal interaction data is used to indicate first interaction data in current interaction data;

performing an intent recognition analysis on current interaction data according to an intent recognition component to obtain a user intent label, and transforming the user intent label into a user intent vector; and performing a retrieve and match on the user intent vector based on a vector database group to obtain user interaction result information, and sending the user interaction result information corresponding to the user type to a human-computer interaction interface in the user interaction mode.

In an implementation, the determining the user interaction mode according to the historical multimodal interaction data and the first modal interaction data includes:

performing a feature analysis on the historical multimodal interaction data and the first modal interaction data to obtain a user interaction feature, and determining the user interaction mode according to the user interaction feature.

In an implementation, the historical multimodal interaction data includes at least one of text data, image data, and audio data, and the performing the feature analysis on the historical multimodal interaction data and the first modal interaction data to obtain the user interaction feature, and determining the user interaction mode according to the user interaction feature includes:

if the first modal interaction data is the text data, determining, according to the user interaction feature, that the user interaction mode is a search box interaction mode containing a feature identification; and if the first modal interaction data is the image data or the audio data, matching a digital human role according to the user interaction feature, and determining that the user interaction mode is a digital human role interaction mode.

In an implementation, the matching the digital human role according to the user interaction feature includes:

obtaining digital human role labels corresponding to a plurality of types of digital humans;

determining a digital human role label with a highest correlation to the user interaction feature according to a correlation between the user interaction feature and the digital human role labels; and determining that the user interacts with a digital human corresponding to the digital human role label with the highest correlation to the user interaction feature.

In an implementation, the performing the intent recognition analysis on the current interaction data according to the intent recognition component to obtain the user intent label includes:

obtaining a complexity level of website information corresponding to the current interaction data;

determining a target intent recognition model according to the complexity level of website information corresponding to the current interaction data;

performing the intent recognition analysis on the current interaction data according to the target intent recognition model to obtain the user intent label.

In an implementation, the determining the target intent recognition model according to the complexity level of website information corresponding to the current interaction data includes:

if the complexity level of website information corresponding to the current interaction data is a simple task, determining the target intent recognition model as a machine learning model; and if the complexity level of website information corresponding to the current interaction data is a complex task, determining the target intent recognition model as a deep learning model.

In an implementation, the user interaction result information includes: retrieval vector information and response content, and the performing the retrieve and match on the user intent vector based on the vector database group to obtain the user interaction result information, and sending the user interaction result information corresponding to the user type to the human-computer interaction interface in the user interaction mode includes:

performing a correlation search in a target vector database through an information retrieval component according to the user intent vector to obtain a target intent vector corresponding to the user intent vector in the target vector database;

determining the retrieval vector information and a target intent related link, which are corresponding to the target intent vector, according to the target vector database, where the target intent related link is used to indicate an information solution link of a plurality of websites associated with the target intent;

inputting the retrieval vector information and the user intent vector into a generating model to obtain the response content; and sending the response content and the target intent related link, which are corresponding to the user type, to the human-computer interaction interface in the user interaction mode.

In an implementation, the inputting the retrieval vector information and the user intent vector into the generating model to obtain the response content includes:

performing a structural transformation on the retrieval vector information and the user intent vector to obtain retrieval information and user intent; and performing an association analysis on the retrieval information and the user intent to obtain the response content.

In a third aspect, the present application provides a website intelligent interaction apparatus including:

an obtaining module, configured to obtain a user identity;

a determining module, configured to determine historical multimodal interaction data and a user type, which are corresponding to the user identity;

the obtaining module being further configured to obtain first modal interaction data sent by a user;

the determining module being further configured to determine a user interaction mode according to the historical multimodal interaction data and the first modal interaction data, where the first modal interaction data is used to indicate first interaction data in current interaction data;

a processing module, configured to perform an intent recognition analysis on current interaction data according to an intent recognition component to obtain a user intent label, and transform the user intent label into a user intent vector;

the processing module being further configured to perform a retrieve and match on the user intent vector based on a vector database group to obtain user interaction result information;

a sending module, configured to send the user interaction result information corresponding to the user type to a human-computer interaction interface in the user interaction mode.

In an implementation, the processing module is further configured to perform a feature analysis on the historical multimodal interaction data and the first modal interaction data to obtain a user interaction feature, and determine the user interaction mode according to the user interaction feature.

In an implementation, the determining module is further configured to, if the first modal interaction data is text data, determine, according to a user interaction feature, that a user interaction mode is a search box interaction mode containing a feature identification;

the determining module is further configured to, if the first modal interaction data is image data or audio data, match a digital human role according to the user interaction feature, and determine that the user interaction mode is a digital human role interaction mode.

In an implementation, the obtaining module is further configured to obtain digital human role labels corresponding to a plurality of types of digital humans;

the determining module is further configured to determine a digital human role label with a highest correlation to the user interaction feature according to a correlation between the user interaction feature and the digital human role labels; and the determining module is further configured to determine that the user interacts with a digital human corresponding to the digital human role label with the highest correlation to the user interaction feature.

In an implementation, the obtaining module is further configured to, obtain a complexity level of website information corresponding to current interaction data;

the determining module is further configured to determine a target intent recognition model according to the complexity level of website information corresponding to the current interaction data; and the processing module is further configured to perform an intent recognition analysis on the current interaction data according to the target intent recognition model to obtain a user intent label.

In an implementation, the determining module is further configured to, if the complexity level of website information corresponding to the current interaction data is a simple task, determine the target intent recognition model as a machine learning model; and the determining module is further configured to, if the complexity level of website information corresponding to the current interaction data is a complex task, determine the target intent recognition model as a deep learning model.

In an implementation, the processing module is further configured to perform a correlation search in a target vector database through an information retrieval component according to the user intent vector to obtain a target intent vector corresponding to the user intent vector in the target vector database;

the determining module is further configured to determine the retrieval vector information and a target intent related link, which are corresponding to the target intent vector, according to the target vector database, where the target intent related link is used to indicate an information solution link of a plurality of websites associated with a target intent;

the processing module is further configured to input the retrieval vector information and the user intent vector into a generating model to obtain a response content; and the sending module is further configured to send the response content and the target intent related link, which are corresponding to the user type, to the human-computer interaction interface in the user interaction mode.

In an implementation, the processing module is further configured to perform a structural transformation on the retrieval vector information and the user intent vector to obtain retrieval information and user intent;

the processing module is further configured to perform an association analysis on the retrieval information and the user intent to obtain the response content.

In a fourth aspect, the present application provides a website intelligent interaction device including:

a memory; and a processor;

where the memory stores computer executable instructions; and the processor executes the computer executable instructions stored in the memory to implement the website intelligent interaction method as described in the second aspect and various possible embodiments of the second aspect.

In a fifth aspect, the present application provides a computer storage medium, storing computer executable instructions which, when executed by a processor, implement the website intelligent interaction method as described in the second aspect and various possible embodiments of the second aspect.

The construction method of the intelligent interaction service system and the website intelligent interaction method provided in the present application involve: constructing an intelligent interaction service system according to a user interaction interface, an intent recognition component, an information retrieval component, a vector database group and a generating model; and in the intelligent interaction service system, through obtaining a user identity, determining historical multimodal interaction data and a user type, which are corresponding to the user identity, obtaining first modal interaction data sent by the user, and determining a user interaction mode according to the historical multimodal interaction data and the first modal interaction data, where the first modal interaction data is used to indicate first interaction data in current interaction data; performing an intent recognition analysis on current interaction data according to the intent recognition component to obtain a user intent label, and transforming the user intent label into a user intent vector; performing a retrieve and match on the user intent vector based on a vector database group to obtain user interaction result information, and sending the user interaction result information corresponding to the user type to a human-computer interaction interface in the user interaction mode. The methods improve the accuracy of user interaction and enhance the user experience.

BRIEF DESCRIPTION OF DRAWINGS

Accompanying drawings here, which are incorporated into the description and form a part of the description, show embodiments in accordance with the present application, and are used together with the description to explain the principle of the present application.

Figure 1:
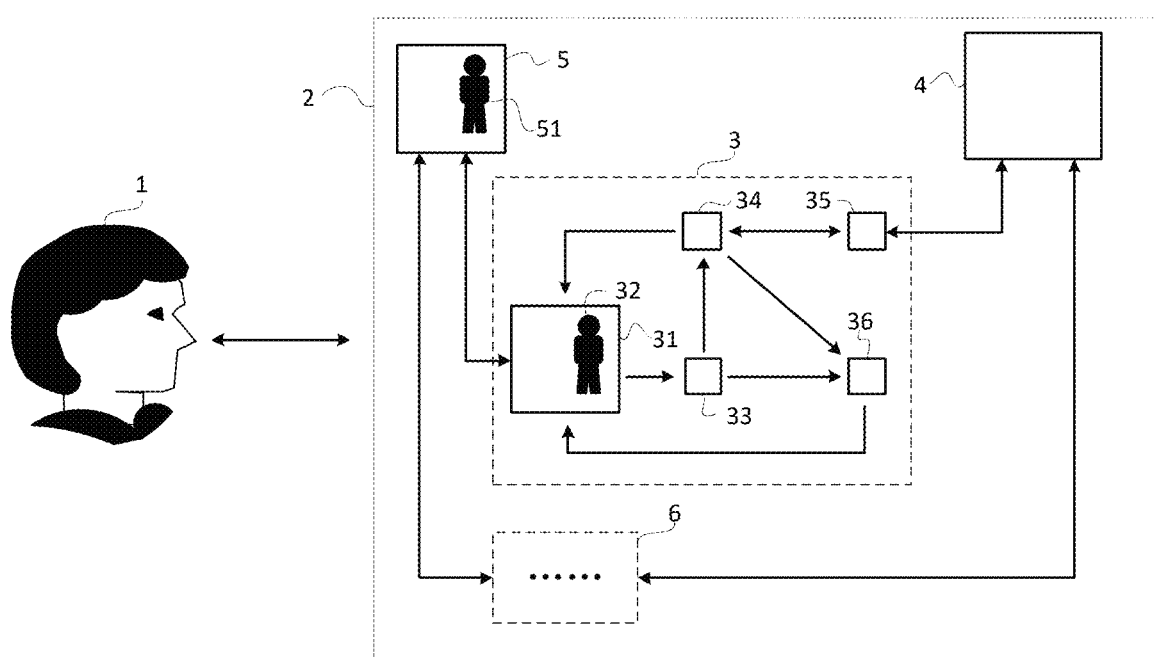
FIG. 1 is a schematic diagram of an intelligent interaction scenario provided in the present application.

Through the above accompanying drawings, definite embodiments of the present application have been shown, and more detailed descriptions will be provided below. These accompanying drawings and textual descriptions are not intended to limit the scope of the concept of the present application in any way, but rather to illustrate the concept of the present application to those skilled in the art by referring to a specific embodiment.

DESCRIPTION OF EMBODIMENTS

In order to make the purpose, technical solutions and advantages of the present application clearer, the technical solutions in the present application will be described clearly and completely in the following in conjunction with the accompanying drawings in the present application, and it is clear that the described embodiments are some of the embodiments of the present application and not all of the embodiments. Based on the embodiments in the present application, all other embodiments obtained by those of ordinary skill in the art without creative labor belong to the protection scope of the present application.

The terms "first", "second", "third", "fourth", etc. (if any) in the description and claims of the present disclosure and the accompanying drawings are used to distinguish similar objects and do not necessarily describe a specific order or sequence. It should be understood that the data used in this way can be interchanged in appropriate circumstances, so that the embodiments of the present disclosure described herein can be implemented, for example, in an order other than those illustrated or described herein.

In the embodiments of the present application, the words, for example, "exemplary" or "for example" are used to indicate examples, illustrations, or descriptions. Any embodiments or design schemes described as "exemplary" or "for example" in the present application should not be interpreted as being more preferred or advantageous than other embodiments or design schemes. To be exact, the use of words such as "exemplary" or "for example" is intended to present relevant concepts in a concrete way.

At present, most official websites of enterprises are used to provide services for users and enable users to understand enterprise services. Methods for a user to obtain an enterprise services includes: Method 1, manually selecting an enterprise service that meets user needs, including 1) manually clicking on by the user a service directory corresponding to his own needs, and 2) extracting a keyword corresponding to the user's input text through a search engine of enterprise website, and searching for an enterprise service corresponding to the keyword on the enterprise website; and Method 2, obtaining by an user an enterprise service that meets his needs through an intelligent interaction service, including 1) interacting by the user with a customer service assistant of an enterprise website through text and extracting a keyword corresponding to the user's input text (the customer service assistant interacts with the user based on a question-and-answer model), and 2) interacting with the enterprise's staff service.

However, among the methods in which the user obtains the enterprise service, the method of manually selecting the enterprise service that meets user needs is low in efficiency, the method of interacting by the user with the customer service assistant is single, and method of interacting by the user with the staff service is high in cost. Therefore, in prior art, there is a lack of understanding of user needs in the way that the user obtains enterprise services, resulting in low matching accuracy of enterprise service and poor user experience.

In view the above problems, the present application provides a construction method of an intelligent interaction service system and a website intelligent interaction method, where there are a plurality of intelligent interaction service systems in intelligent interaction engine platform (a plurality of websites linked to the intelligent interaction engine platform are a plurality of upstream and downstream associated links embedded in website addresses corresponding to the intelligent interaction service system). The vector database of each intelligent interaction service system is correlated with a vector database group of the intelligent interaction engine platform, so that construction data of the vector database of each intelligent interaction service system includes not only interaction data of the intelligent interaction service system, but also shareable interaction data information of other intelligent interaction service systems (that is to say, each intelligent interaction service system obtains a solution containing upstream and downstream information by retrieving and matching in a plurality of vector databases integrated with a plurality of website addresses). This method not only enables each intelligent interaction service system to have a unique vector database, but also enables the vector database of each intelligent interaction service system to be more abundant, thereby providing users with accurate and comprehensive information interaction experience.

FIG. 1 is a schematic diagram of an intelligent interaction scenario provided in the present application. As shown in FIG. 1, the implementation scenario of the present application is only described for an intelligent interaction method of one intelligent interaction service system in the intelligent interaction engine platform, where reference sign 6 is other intelligent interaction service system, which is consistent with the intelligent interaction method of intelligent interaction service system 3 in the present implementation scenario and will not be repeated here.

User 1 can interact with platform digital human 51 and website digital human 32. When user 1 interacts with platform digital human 51, intelligent interaction engine platform 2 obtains a user identity through user interaction interface 5, and determines historical multimodal interaction data and a user type that are corresponding to the user identity; then, when obtaining first modal interaction data sent by the user, intelligent interaction engine platform 2 sends the first modal interaction data to intelligent interaction service system 3; when obtaining the first modal interaction data sent by the user or the first modal interaction data transmitted by intelligent interaction engine platform 2, (if the first modal interaction data is text data, determining, according to a user interaction feature, that the user interaction mode is a search box interaction mode containing a feature identification; and if the first modal interaction data is image data or audio data, matching a digital human role according to the user interaction feature, and determining that the user interaction mode is a digital human role interaction mode) intelligent interaction service system 3 obtains a complexity level of website information of intelligent interaction service system 3 corresponding to current interaction data, determines an intent recognition model of intent recognition component 33 according to the complexity level of website information corresponding to the current interaction data, performs an intent recognition analysis on the current interaction data according to the intent recognition model of intent recognition component 33 to obtain a user intent label, converts the user intent label into a user intent vector, performs a correlation search in vector database 35 through information retrieval component 34 according to the user intent vector to obtain an intent vector corresponding to the user intent vector in vector database 35, determines retrieval vector information and an intent related link corresponding to the intent vector according to vector database 35, inputs the retrieval vector information and the user intent vector into generating model 36 to obtain a response content, and sends the response content and the intent related link, which are corresponding to the user type, to user interaction interface 31 in a user interaction mode. When the user interacts with user interaction interface 5 of the intelligent interaction engine platform, user interaction interface 31 needs to transmit the response content and the intent related link corresponding to the user type to user interaction interface 5; and user interaction interface 5 displays the response content and the intent related link corresponding to the user type to the user in the user interaction mode.

The construction method of the intelligent interaction service system and the website intelligent interaction method provided in the present application involve constructing an intelligent interaction service system according to a user interaction interface, an intent recognition component, an information retrieval component, a vector database group and a generating model; and in the intelligent interaction service system, through obtaining a user identity, determining historical multimodal interaction data and a user type that are corresponding to the user identity; obtaining first interaction data in current interaction data sent by a user, and determining a user interaction mode according to the historical multimodal interaction data and the first interaction data in the current interaction data; performing an intent recognition analysis on current interaction data according to an intent recognition component to obtain a user intent label, and transforming the user intent label into a user intent vector; performing a retrieve and match on the user intent vector based on a vector database group to obtain user interaction result information, and sending the user interaction result information corresponding to the user type to a human-computer interaction interface in the user interaction mode. The methods improve the accuracy of user interaction and enhance the user experience.

The technical solutions of the present application and how the technical solutions of the present application solve the above technical problems are described in detail below by way of specific embodiments. The following specific embodiments can be combined with each other, and the same or similar concepts or processes may not be repeated in some embodiments. Embodiments of the present application will be described below in conjunction with the accompanying drawings.

A detailed description of a construction method of an intelligent interaction service system for a single website is provided: obtaining a website link and a related authorization; determining an intent recognition component according to historical query information and an intent recognition model of a single website; performing an index extraction on the historical query information of this website according to an index technology to obtain historical query information with an index structure, and determining an information retrieval component according to the historical query information of the single website and the historical query information with the index structure; obtaining historical interaction data of the single website, to determine a vector database; constructing an intelligent interaction service system of the single website according to a user interaction interface, the intent recognition component, the information retrieval component, the vector database and a generating model; and embedding the intelligent interaction service system of the single website into a webpage of a corresponding website.

Figure 2:
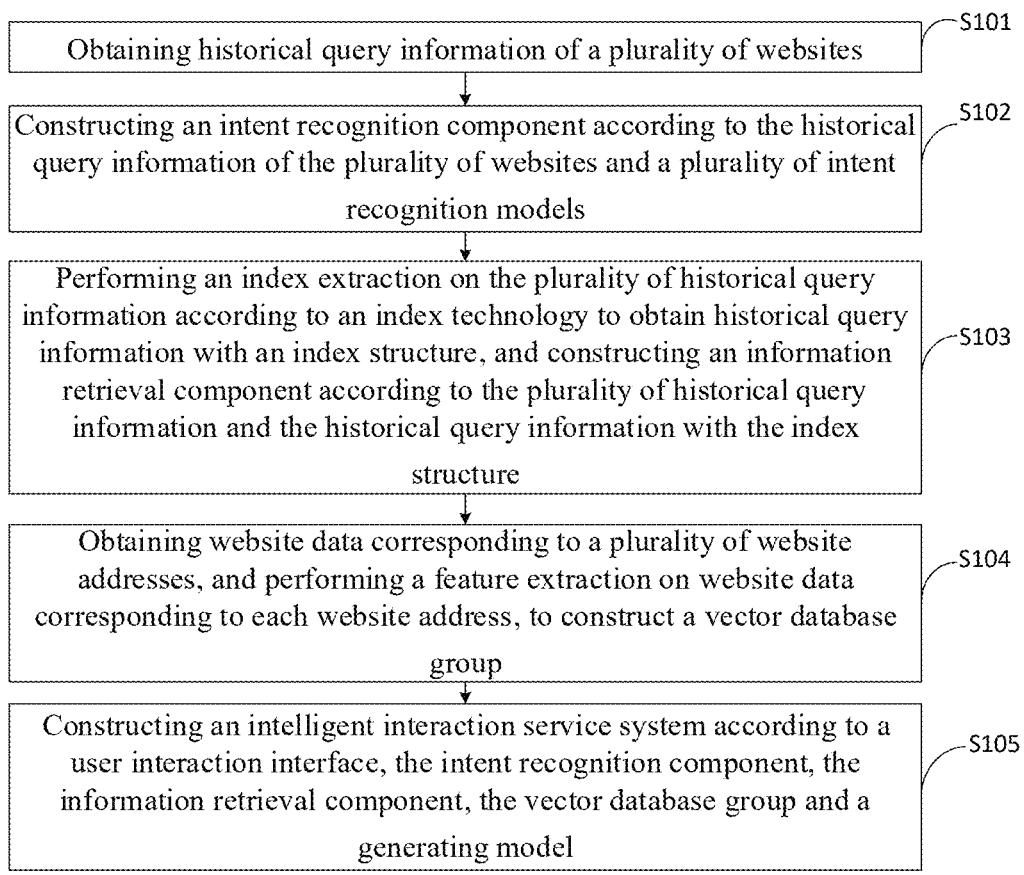
FIG. 2 is a first flowchart of a construction method of an intelligent interaction service system provided in the present application.

FIG. 2 is a first flowchart of a construction method of an intelligent interaction service system provided in the present application. For example, an executive entity can be an intelligent interaction engine platform, as shown in FIG. 2, a construction method of an intelligent interaction service system provided in this embodiment includes steps below.

S101, obtaining historical query information of a plurality of websites.

Query information is used to indicate query information input into a website by the user and query content associated with the query information, and the historical query information is used to indicate query information input into the website by the user at a historical time and query content associated with the query information.

The reason for obtaining historical query information of a plurality of websites is that the intelligent interaction engine platform is associated with a plurality of websites, and an intelligent interaction service system can be constructed for the plurality of websites.

S102, constructing an intent recognition component according to the historical query information of the plurality of websites and a plurality of intent recognition models.

The intent recognition model is a natural language processing technique for understanding the user's intent expressed in a dialogue or text. The intent recognition is a key component in many intelligent interaction service systems, chatbots, and voice assistants, and can help the system to accurately understand user needs and provide a corresponding response.

The intent recognition component includes a plurality of intent recognition models, and each website is associated with only one intent recognition model. The intent recognition models associated with different websites can be the same or different.

S103, performing an index extraction on the plurality of historical query information according to an index technology to obtain historical query information with an index structure, and constructing an information retrieval component according to the plurality of historical query information and the historical query information with the index structure.

The index technology is a technique for accelerating data retrieval and query operation. It makes it possible to perform fast and efficient query on a large-scale dataset through creating an auxiliary structure of data.

The information retrieval component is used to determine content associated with user query information according to the user query information.

It can be understood that performing the index extraction on a plurality of historical query information using the index technology is in order to quickly query the content associated with the historical query information according to the historical query information sent by the user.

S104, obtaining website data corresponding to the plurality of website addresses, and performing a feature extraction on website data corresponding to each website address, to construct a vector database group.

The vector database group includes a plurality of vector databases. Since the vector database corresponding to each website address includes website data that can be shared by the plurality of website addresses, as well as unsharable website data corresponding to the current website address, the vector database corresponding to each website address is different.

It can be understood that a web crawler is used to acquire data from each website address, the acquired data is cleaned and pre-processed, a natural language processing techniques is used to perform a feature extraction on website data, the extracted feature vector is stored in a vector database corresponding to each website address, and a plurality of vector databases corresponding to a plurality of website addresses form a vector database group.

S105, constructing an intelligent interaction service system according to a user interaction interface, the intent recognition component, the information retrieval component, the vector database group and a generating model.

The user interaction interface refers to a window through which the user communicates with the intelligent interaction service system, including an input box and a chat bubble, the data box allows the user to input a product or service information that the user wants to retrieve; the chat bubble displays a conversation between the user and the intelligent assistant, and replies of the intelligent assistant are distinguished by different colors to improve readability. Reply information generated by the intelligent interaction service system can be output in various forms such as text, voice, etc. The generated content includes a link to the source of the content, which supports the user to click and access it.

The generating model is a core component responsible for generating natural, smooth, and accurate text responses, which uses built-in pretrained knowledge and externally retrieved information to provide highly relevant and factually accurate responses, and can handle multiple rounds of dialogue while maintaining the coherence and relevance of the context.

It can be understood that the user input is received through the user interaction interface, the intent recognition component is used to understand the user intent, the relevant information is obtained through the information retrieval component and the vector database group, and the generating model is used to generate the natural language response. Ultimately, through the integration of the intelligent interaction service system, various components are organically combined to provide the intelligent interaction service system.

The construction method of the intelligent interaction service system provided in the present application involves obtaining historical query information of a plurality of websites; constructing an intent recognition component according to the historical query information of the plurality of websites and a plurality of intent recognition models; performing an index extraction on the plurality of historical query information according to an index technology to obtain the historical query information with an index structure; constructing an information retrieval component according to the plurality of historical query information and the historical query information with the index structure; obtaining website data corresponding to a plurality of website addresses, and performing a feature extraction on website data corresponding to each website address, to construct a vector database group; and constructing an intelligent interaction service system according to a user interaction interface, the intent recognition component, the information retrieval component, the vector database group and a generating model. This method improves the intelligence and accuracy of the intelligent interaction service system.

Figure 3:
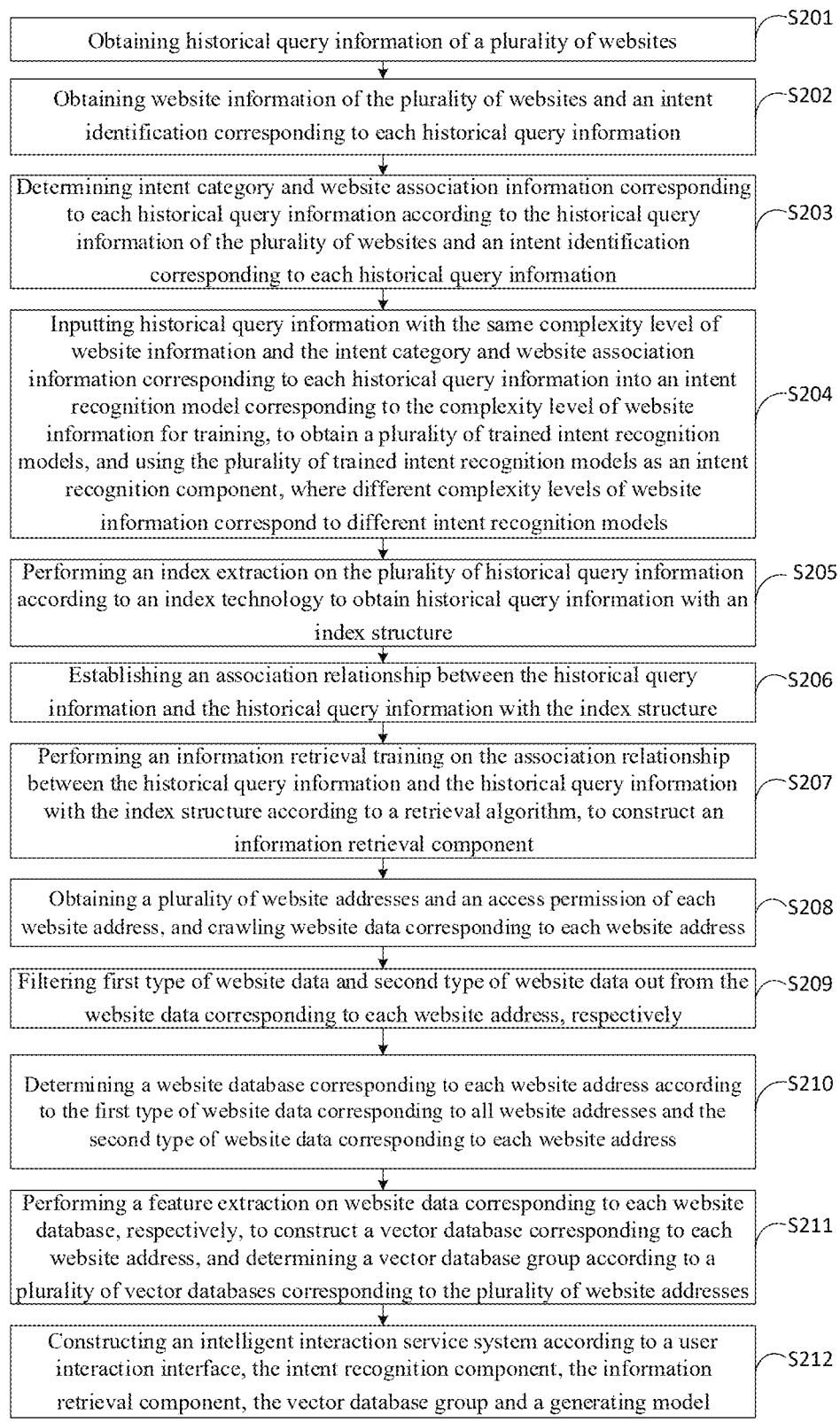
FIG. 3 is a second flowchart of a construction method of an intelligent interaction service system provided in the present application.

FIG. 3 is a second flowchart of a construction method of an intelligent interaction service system provided in the present application. As shown in FIG. 3, this embodiment provides a detailed explanation of the construction method of an intelligent interaction service system based on the embodiment in FIG. 2. The construction method of an intelligent interaction service system shown in this embodiment includes steps below.

S201, obtaining historical query information of a plurality of websites.

S201 is similar to S101 and will not be repeated here.

S202, obtaining website information of the plurality of websites and an intent identification corresponding to each historical query information.

The website information is used to indicate a product and service data corresponding to the websites.

The intent identification corresponding to the query information is one or more labels or categories assigned to a query input by the user after intent analysis in search engines or information retrieval systems.

This step can use the web crawler to extract the website information from a target website, typically including title, description, keyword, content, product, and service of the website. The intent identification corresponding to the historical query information can be obtained through a manual annotation or an existing service (such as Application Programming Interface API).

S203, determining intent category and website association information corresponding to each historical query information according to the historical query information of the plurality of websites and the intent identification corresponding to each historical query information.

It can be understood that according to the historical query information of the plurality of websites, the intent identification corresponding to each historical query information, and the website corresponding to each query information, a frequency of the intention category of query information corresponding to each website is determined and the intention category and website association information associated with each website are identified, and at the same time, an intent strength (such as user's click, dwell time, etc.) of the query can be considered to optimize this association. For each website, its contents, functions, and user groups can be analyzed to verify and refine the association with the intention category, and establish the association between the website and the intention category.

S204, inputting historical query information with the same complexity level of website information and the intent category and website association information corresponding to each historical query information into an intent recognition model corresponding to the complexity level of website information for training, to obtain a plurality of trained intent recognition models, and using the plurality of trained intent recognition models as an intent recognition component, where different complexity levels of website information correspond to different intent recognition models.

The complexity level of website information depends on a plurality of factors, including but not limited to the following aspects: Content diversity: the more types of information a website provides, the higher the level of its complexity is usually; Information depth: the level of detail and depth of information also affects the level of complexity of a website, some websites providing basic information and overviews, while others providing in-depth analysis, research reports, or user evaluations; Interactivity: the level of interaction between the website and the user also affects the level of complexity of the website; whether or not the website supports personalized customizations also affects the level of complexity of the website; Multilanguage support: if the website supports multiple languages, the level of its complexity will increase accordingly. The complexity level of website information includes: a simple task and a complex task.

It can be understood that the historical query information is divided into a plurality of training sets according to different complexity levels of website information, and each training set corresponds to a specific complexity level, and for each training set, an intent recognition model is selected for training, and a plurality of trained intent recognition models are deployed as an intent recognition component; when new query information is input, an appropriate intent recognition model is first selected according to the complexity level of the website information for processing, the query information is input into the selected model to obtain a result of intent recognition.

S205, performing an index extraction on the plurality of historical query information according to an index technology to obtain historical query information with an index structure.

It can be understood that the index structure of the query information is usually determined based on content, frequency, importance and retrieval need of the historical query information. If the query information is mainly based on a keyword, an index entry can be created for each keyword in the query information; and if the query information has a timestamp or date, a time-based index can be created to retrieve query information in chronological order. The index technology is mainly used to improve query speed and data retrieval efficiency when processing the historical query information.

S206, establishing an association relationship between the historical query information and the historical query information with the index structure.

The association relationship between the historical query information and the historical query information with the index structure is established. If the query information changes, it is necessary to update the index entry, which usually involves deleting an old index entry and adding a new index entry; if a piece of query information is deleted, all index entries related to the piece of query information should be deleted at the same time. A database optimization tool should be run regularly to maintain establishment of the association between the historical query information and the historical query information with the index structure.

S207, performing an information retrieval training on the association relationship between the historical query information and the historical query information with the index structure according to a retrieval algorithm, to construct an information retrieval component.

Common retrieval algorithms include keyword-based retrieval (such as TF-IDF), vector-based retrieval (such as LSI, LDA), and deep learning-based retrieval (such as BERT).

It can be understood that a retrieval model (e.g., a keyword based similarity calculation model, a vector based retrieval model, or a deep learning model) is matched according to a retrieval algorithm, the retrieval model is trained by using a training set, the model is validated by using a validation set, and the model is optimized according to a validation result, so as to construct an efficient and accurate information retrieval component.

S208, obtaining a plurality of website addresses and an access permission of each website address, and crawling website data corresponding to each website address.

The purpose of obtaining the plurality of website addresses and the access permission of each website address is to ensure the compliance of accessing website data.

S209, filtering first type of website data and second type of website data out from the website data corresponding to each website address, respectively.

The first type of website data is used to indicate shareable website data, and the second type of website data is used to indicate unshareable website data.

Filtering the first type of website data and the second type of website data out from the website data corresponding to each website address is to differentiate the shareable website data from the unshareable website data, so that the shareable website data corresponding to each website address can be used as the training data for the website database corresponding to each website address, and that the unshareable website data corresponding to each website address can be used as personalized training data for the website database corresponding to each website address.

S210, determining a website database corresponding to each website address according to the first type of website data corresponding to all website addresses and the second type of website data corresponding to each website address.

The first type of website data corresponding to all website addresses and the second type of website data corresponding to each website address are collated, and the analyzed first type of website data corresponding to all website addresses and second type of website data corresponding to each website address are used to construct the website database corresponding to each website address.

S211, performing a feature extraction on website data corresponding to each website database, respectively, to construct a vector database corresponding to each website address, and determining a vector database group according to a plurality of vector databases corresponding to the plurality of website addresses.

It can be understood that the preprocessing and feature extraction are performed on the website data corresponding to each website database, respectively, the data in the website database is converted into vectors, the vectors can be stored in the vector database, and the vector databases corresponding to all the website addresses are combined together to form a vector data set.

S212: constructing an intelligent interaction service system according to a user interaction interface, the intent recognition component, the information retrieval component, the vector database group and a generating model.

S212 is similar to S105 and will not be repeated here.

The construction method of the intelligent interaction service system provided in the present application involves, through obtaining historical query information of a plurality of website, obtaining website information of the plurality of websites and an intent identification corresponding to each historical query information; determining intent category and website association information corresponding to each historical query information according to the historical query information of the plurality of websites and the intent identification corresponding to each historical query information; inputting historical query information with the same complexity level of website information and the intent category and website association information corresponding to each historical query information into an intent recognition model corresponding to the complexity level of website information for training, to obtain a plurality of trained intent recognition models, and using the plurality of trained intent recognition models as an intent recognition component, where different complexity levels of website information correspond to different intent recognition models; performing an index extraction on the plurality of historical query information according to an index technology to obtain historical query information with an index structure, and constructing an association relationship between the historical query information and the historical query information with the index structure; performing an information retrieval training on the association relationship between the historical query information and the historical query information with the index structure according to a retrieval algorithm, to construct an information retrieval component; obtaining a plurality of website addresses and an access permission of each website address, and crawling website data corresponding to each website address; filtering first type of website data and second type of website data out from the website data corresponding to each website address, respectively; determining a website database corresponding to each website address according to the first type of website data corresponding to all website addresses and the second type of website data corresponding to each website address; performing a feature extraction on website data corresponding to each website database, respectively, to construct a vector database corresponding to each website address, and determining a vector database group according to a plurality of vector databases corresponding to the plurality of website addresses; and constructing an intelligent interaction service system according to a user interaction interface, the intent recognition component, the information retrieval component, the vector database group and a generating model. This method improves the intelligence and accuracy of the intelligent interaction service system.

Figure 4:
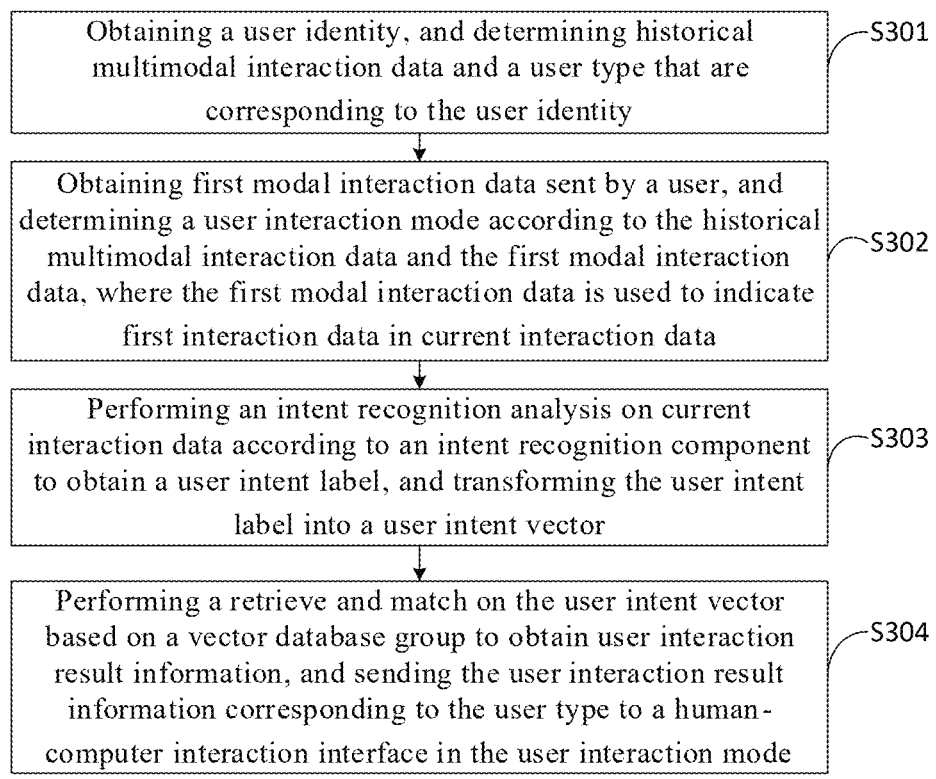
FIG. 4 is a first flowchart of a website intelligent interaction method provided in the present application.

FIG. 4 is a first flowchart of a website intelligent interaction method provided in the present application. For example, an executive entity may be an intelligent interaction service system. As shown in FIG. 4, a website intelligent interaction method provided in the present embodiment includes:

S301, obtaining a user identity, and determining historical multimodal interaction data and a user type that are corresponding to the user identity.

The user identity is used to indicate a user's ID and password for logging into a website.

The historical multimodal interaction data is used to indicate data generated in different interaction modes of the user, such as text, speech, image, and video. These data may come from user interaction records and user behavior logs in interactions with the intelligent interaction service system.

The user type includes: a general user and a member user. The general user can access public information on the website, while the member user can not only access public information on the website, but also access non-public information and technical solutions.

S302, obtaining first modal interaction data sent by the user, and determining a user interaction mode according to the historical multimodal interaction data and the first modal interaction data, where the first modal interaction data is used to indicate first interaction data in current interaction data.

The user interaction mode is used to indicate a way in which the user interacts with the intelligent interaction service system.

In an implementation, a specific implementation of determining the user interaction mode according to the historical multimodal interaction data and the first modal interaction data is:

performing a feature analysis on the historical multimodal interaction data and the first modal interaction data to obtain a user interaction feature, and determining a user interaction mode according to the user interaction feature.

It can be understood that by obtaining the first modal interaction data sent by the user and performing analysis and processing in combination with the historical multimodal interaction data, the intelligent interaction service system can determine an interaction mode of the user and provide more personalized and intelligent service accordingly.

S303, performing an intent recognition analysis on current interaction data according to an intent recognition component to obtain a user intent label, and transforming the user intent label into a user intent vector.

The user intent label refers to a label for describing a main purpose or motivation of the user when performing an operation or query.

The generation of the user intent label generally relies on a natural language processing technology such as text classification, sentiment analysis, and entity recognition. Through training models to recognize different intent modes, the intelligent interaction service system can automatically assign a corresponding intent label to a user's input.

It can be understood that when a user interacts with an intelligent interaction service system, the intelligent interaction service system generally include an intent recognition component for analyzing the user's input and determining an intent behind it, and once the user's intent has been identified, the system may identify this intent as a label and further convert it into a vector form for use in subsequent processing or machine learning model.

S304, performing a retrieve and match on the user intent vector based on a vector database group to obtain user interaction result information, and sending the user interaction result information corresponding to the user type to a human-computer interaction interface in the user interaction mode.

It can be understood that a retrieval operation is performed in the vector database using the user intent vector, a storage vector that is most similar to the user intent vector is matched according to a similarity matching method, corresponding user interaction result information is obtained according to the retrieved similar vector, and the matched results are screened and sorted according to a business requirement or a rule of the intelligent interaction service system, to obtain the user interaction result information.

Due to different user types, the human-computer interaction interface displays different contents. For general users, publishable user interaction result information can be sent to the human-computer interaction interface in the user interaction mode; and for member users, publishable and unpublishable user interaction result information and user interaction result information related to the technical solution can be sent to the human-computer interaction interface in the user interaction mode.

The website intelligent interaction method provided in the present application involves, through obtaining a user identity, determining historical multimodal interaction data and a user type that are corresponding to the user identity, obtaining first modal interaction data sent by the user, and determining a user interaction mode according to the historical multimodal interaction data and the first modal interaction data, where the first modal interaction data is used to indicate first interaction data in current interaction data; performing an intent recognition analysis on current interaction data according to an intent recognition component to obtain a user intent label, and transforming the user intent label into a user intent vector; performing a retrieve and match on the user intent vector based on a vector database group to obtain user interaction result information, and sending the user interaction result information corresponding to the user type to a human-computer interaction interface in the user interaction mode. This method improves the accuracy of user interaction and enhances the user experience.

Figure 5:
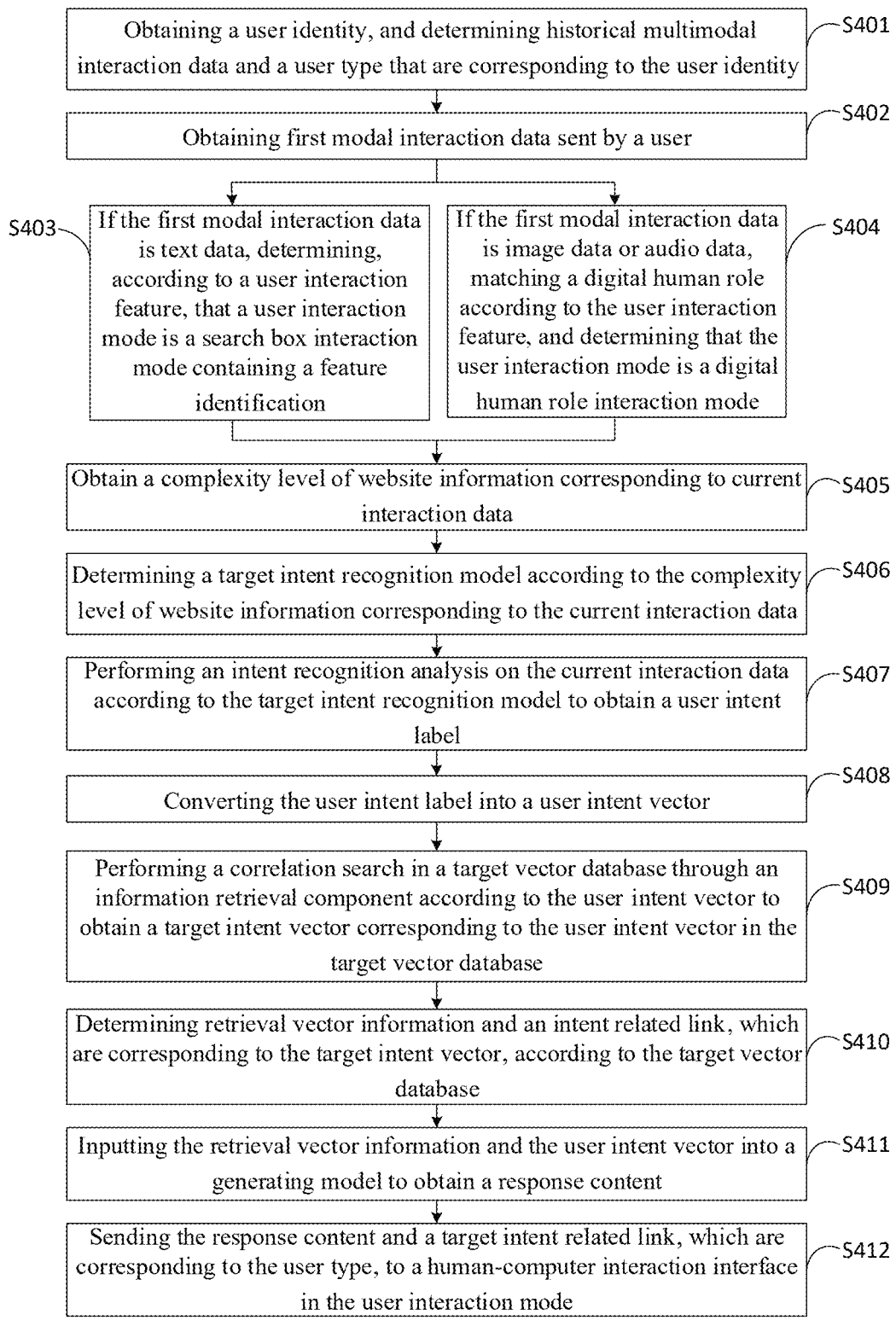
FIG. 5 is a second flowchart of a website intelligent interaction method provided in the present application.

FIG. 5 is a second flowchart of a website intelligent interaction method provided in the present application. As shown in FIG. 5, this embodiment provides a detailed explanation for a website intelligent interaction method based on the embodiment in FIG. 4. The website intelligent interaction method shown in this embodiment includes:

S401, obtaining a user identity, and determining historical multimodal interaction data and user type that are corresponding to the user identity.

S401 is similar to S301 and will not be repeated here.

S402, obtaining first modal interaction data sent by the user.

The first modal interaction data includes one of text data, image data and audio data.

It can be understood that when the intelligent interaction service system detects first interaction data in current interaction data, this data is the first modal interaction data.

S403, if the first modal interaction data is text data, determining, according to a user interaction feature, that a user interaction mode is a search box interaction mode containing a feature identification.

When the user inputs text data, the input content is detected in real time to determine whether it contains an existing feature identification, and when the user completes the input and clicks a search button, the input text is analyzed, to match the text input by the user with an existing feature identification, and if the match is successful, then it is determined that the user interaction mode is a search box interaction mode that contains the feature identification.

S404, if the first modal interaction data is image data or audio data, matching a digital human role according to the user interaction feature, and determining that the user interaction mode is a digital human role interaction mode.

The digital human role can be, for example, a customer service manager, a product manager, a technical expert, and an after-sales operation and maintenance.

It can be understood that, if the first mode interaction data is image data or audio data, then the extracted user interaction feature can be matched with the existing digital human role feature, a similarity calculation and machine learning classifier can be used to achieve matching, and the digital human role that best matches the user interaction feature can be selected as an interaction object according to the matching result.

In an implementation, a specific implementation of matching the digital human role according to the user interaction feature is:

obtaining digital human role labels corresponding to a plurality of types of digital humans; determining a digital human role label with a highest correlation to the user interaction feature according to a correlation between the user interaction feature and the digital human role labels; determining that the user interacts with a digital human corresponding to the digital human role label with the highest correlation to the user interaction feature.

It can be understood that the user interaction feature is input into a correlation model, the correlation model will output the digital human role label related to the user interaction feature, and according to the digital human role label output by the model, a digital human corresponding to the user interaction feature is selected from the existing digital humans for interaction.

S405, obtaining a complexity level of website information corresponding to the current interaction data.

Since each website has a different complexity level of website information and a different intent recognition model is selected, before determining the intent recognition model, it is necessary to obtain a content density, information hierarchy, interactive element, technical complexity, and loading speed of the website, so as to determine the complexity level of website information corresponding to the current interaction data.

S406, determining a target intent recognition model according to the complexity level of website information corresponding to the current interaction data.

In an implementation, a specific implementation of this step is: if the complexity level of website information corresponding to the current interaction data is a simple task, determining that a target intent recognition model is a machine learning model; and if the complexity level of website information corresponding to the current interaction data is a complex task, determining that a target intent recognition model is a deep learning model.

It can be understood that an appropriate intent recognition model is selected according to the complexity of the website information. For a simple task a traditional machine learning model, such as logistic regression or a support vector machine, is used and for a complex task, a deep learning model, such as BERT, or other model based on a Transformer architecture, is used.

S407, performing an intent recognition analysis on the current interaction data according to the target intent recognition model to obtain a user intent label.

The current interaction data is preprocessed, including text cleaning (removing noise, HTML labels, and special characters), word splitting, and removing deactivated words, and the feature is extracted from the preprocessed data by TF-IDF or Word2Vec method, and the extracted feature or preprocessed text is input into the target intent recognition model, the target intent recognition model may process the input data and output one or more intent labels as the user intent label.

S408, converting the user intent label into a user intent vector.

The user intent label is converted into the user intent vector, which can help in similarity comparison between intents, extension of intent classification, and integration of natural language tasks.

S409, performing a correlation search in a target vector database through an information retrieval component according to the user intent vector to obtain a target intent vector corresponding to the user intent vector in the target vector database.

The information retrieval component performs a search operation in the target vector database, traverses each user intent vector in the database, and uses a selected similarity matching method to calculate the similarity between the target vector database and the user intent vector. The target intent vector is ranked according to a similarity score and one or more target intent vectors with the highest similarity are selected.

S410, determining retrieval vector information and a target intent related link, which are corresponding to the target intent vector, according to the target vector database.

The target intent related link is used to indicate an information solution link of a plurality of websites that is associated with the target intent. That is to say, a plurality of upstream and downstream related links are embedded in website address corresponding to each website linked by the intelligent interaction engine, and the upstream and downstream related links are searched and matched in the vector database integrated by a plurality of website addresses to obtain a solution containing upstream and downstream information, thereby breaking the information isolated island and providing users with more accurate and comprehensive information interaction experience.

Once the intent vector most similar to the target intent vector is determined, all information related to this intent vector can be retrieved from the database, the information includes: retrieval vector information and target intent related link.

S411, inputting the retrieval vector information and the user intent vector into a generating model to obtain a response content.

In an implementation, a specific implementation of this step is: performing a structural transformation on the retrieval vector information and the user intent vector to obtain retrieval information and user intent; and performing an association analysis on the retrieval information with the user intent to obtain the response content.

It can be understood that first, a generating model is selected, which may be a sequence-to-sequence based model, such as RNN, LSTM, GPU, or Transformer architecture; then, a feature of the retrieval vector information and a feature of the user intent vector are merged or spliced, and input into the generating model; and finally, the response content is generated.

S412, sending the response content and the target intent related link, which are corresponding to the user type, to the human-computer interaction interface in the user interaction mode.

After sending the response content and the target intent related link, which are corresponding to the user type, to the human-computer interaction interface in the user interaction mode, the response content and the target intent related link, which are corresponding to the user type, are sent to a user terminal for the user to view.

The website intelligent interaction method provided in the present application involves, through obtaining a user identity, determining historical multimodal interaction data and user type that are corresponding to the user identity; obtaining first modal interaction data sent by the user; if the first modal interaction data is text data, determining, according to a user interaction feature, that a user interaction mode is a search box interaction mode containing a feature identification, and if the first modal interaction data is image data or audio data, matching a digital human role according to the user interaction feature, and determining that the user interaction mode is a digital human role interaction mode; obtaining a complexity level of website information corresponding to current interaction data; determining a target intent recognition model according to the complexity level of website information corresponding to the current interaction data; performing an intent recognition analysis on the current interaction data according to the target intent recognition model to obtain a user intent label; transforming the user intent label into a user intent vector, and performing a correlation search in a target vector database through an information retrieval component according to the user intent vector to obtain a target intent vector corresponding to the user intent vector in the target vector database; determining retrieval vector information and target intent related link, which are corresponding to the target intent vector, according to the target vector database; inputting the retrieval vector information and the user intent vector into a generating model to obtain a response content; and sending the response content and the target intent related link, which are corresponding to the user type, to the human-computer interaction interface in the user interaction mode. This method improves the accuracy of user interaction and enhances the user experience.

Figure 6:
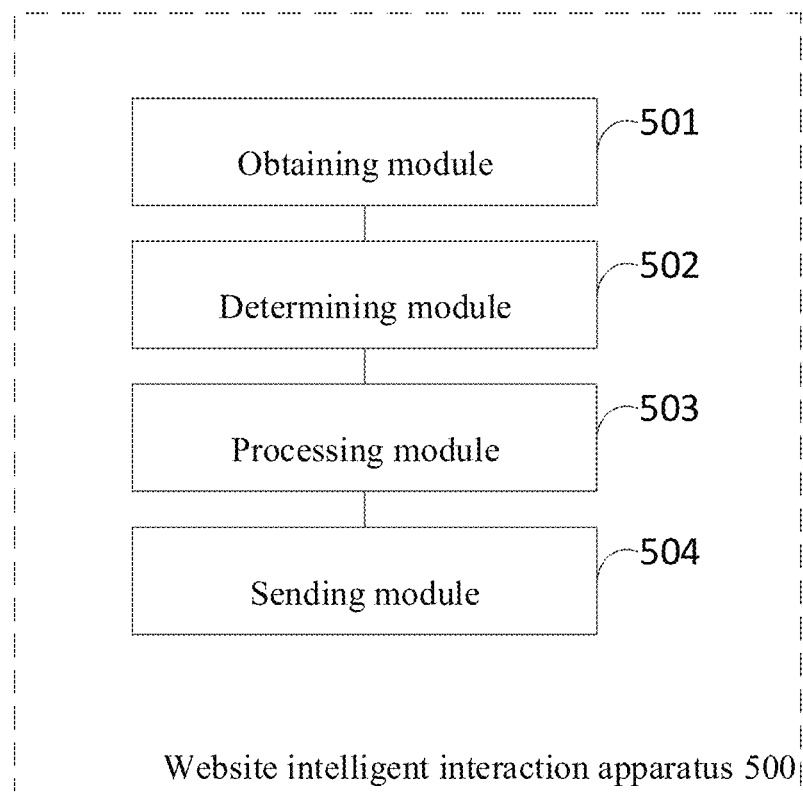
FIG. 6 is a schematic structural diagram of a website intelligent interaction apparatus provided in the present application.

FIG. 6 is a schematic structural diagram of a website intelligent interaction apparatus provided in the present application. As shown in FIG. 6, the present application provides a website intelligent interaction apparatus, which is website intelligent interaction apparatus 500, including:

an obtaining module 501, configured to obtain a user identity;

a determining module 502, configured to determine historical multimodal interaction data and a user type that are corresponding to the user identity;

the obtaining module 501 being further configured to obtain first modal interaction data sent by a user;

the determining module 502 being further configured to determine a user interaction mode according to the historical multimodal interaction data and the first modal interaction data, where the first modal interaction data is used to indicate first interaction data in current interaction data;

a processing module 503, configured to perform an intent recognition analysis on current interaction data according to an intent recognition component to obtain a user intent label, and transform the user intent label into a user intent vector;

the processing module 503 being further configured to perform a retrieve and match on the user intent vector based on a vector database group to obtain user interaction result information; and a sending module 504, configured to send the user interaction result information corresponding to the user type to a human-computer interaction interface in the user interaction mode.

In an implementation, the processing module 503 is further configured to perform a feature analysis on the historical multimodal interaction data and the first modal interaction data to obtain a user interaction feature, and determine the user interaction mode according to the user interaction feature.

In an implementation, the determining module 502 is further configured to, if the first modal interaction data is the text data, determine, according to a user interaction feature, that the user interaction mode is a search box interaction mode containing a feature identification; and the determining module 502 is further configured to, if the first modal interaction data is the image data or the audio data, match a digital human role according to the user interaction feature, and determine that the user interaction mode is a digital human role interaction mode.

In an implementation, the obtaining module 501 is further configured to obtain digital human role labels corresponding to a plurality of types of digital humans;

the determining module 502 is further configured to determine a digital human role label with a highest correlation to the user interaction feature according to a correlation between the user interaction feature and the digital human role labels; and the determining module 502 is further configured to determine that the user interacts with a digital human corresponding to the digital human role label with the highest correlation to the user interaction feature.

In an implementation, the obtaining module 501 is further configured to obtain a complexity level of website information corresponding to the current interaction data;

the determining module 502 is further configured to determine a target intent recognition model according to the complexity level of website information corresponding to the current interaction data; and the processing module 503 is further configured to perform an intent recognition analysis on the current interaction data according to the target intent recognition model to obtain a user intent label.

In an implementation, the determining module 502 is further configured to, if the complexity level of website information corresponding to the current interaction data is a simple task, determine that the target intent recognition model is a machine learning model; and the determining module 502 is further configured to, if the complexity level of website information corresponding to the current interaction data is a complex task, determine that the target intent recognition model is a deep learning model.

In an implementation, the processing module 503 is further configured to perform a correlation search in a target vector database through an information retrieval component according to the user intent vector to obtain a target intent vector corresponding to the user intent vector in the target vector database;

the determining module 502 is further configured to determine the retrieval vector information and a target intent related link, which are corresponding to the target intent vector, according to the target vector database, where the target intent related link is used to indicate an information solution link of a plurality of websites associated with the target intent;

the processing module 503 is further configured to input the retrieval vector information and the user intent vector into a generating model to obtain a response content; and the sending module 504 is further configured to send the response content and the target intent related link, which are corresponding to the user type, to the human-computer interaction interface in the user interaction mode.

In an implementation, the processing module 503 is further configured to perform a structural transformation on the retrieval vector information and the user intent vector to obtain retrieval information and user intent; and the processing module 503 is further configured to perform an association analysis on the retrieval information with the user intent to obtain the response content.

Figure 7:
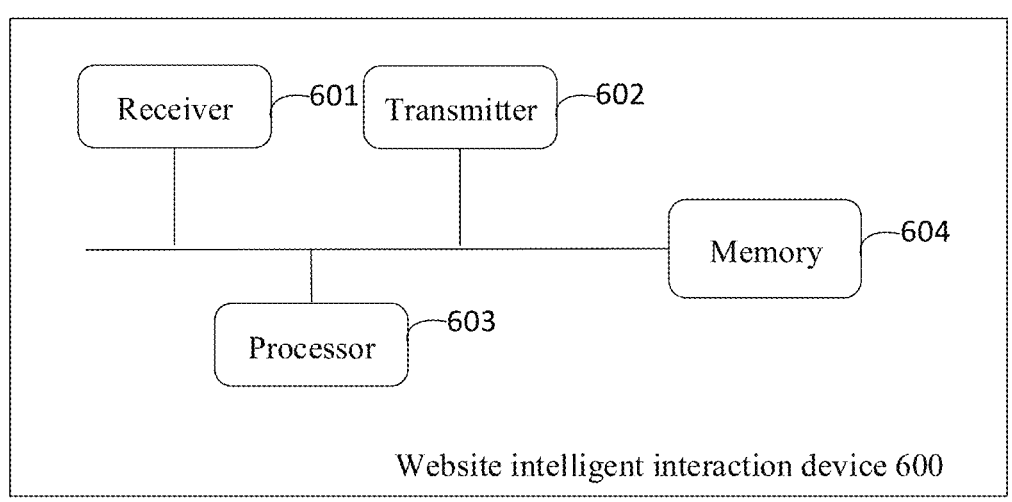
FIG. 7 is a schematic structural diagram of a website intelligent interaction device provided in the present application.

FIG. 7 is a schematic structural diagram of a website intelligent interaction device provided in the present application. As shown in FIG. 7, the present application provides a website intelligent interaction device, which is website intelligent interaction device 600, including a receiver 601, a transmitter 602, a processor 603, and a memory 604.

The receiver 601 is configured to receive instructions and data;

the transmitter 602 is configured to send instructions and data;

the memory 604 is configured to store computer executable instructions; and the processor 603 is configured to execute the computer executable instructions stored in the memory 604 to implement various steps of the website intelligent interaction method in the above embodiments. For specific details, please refer to relevant description in the embodiments of the website intelligent interaction method mentioned above.

In an implementation, the above-mentioned memory 604 can be independent or integrated with the processor 603.

When the memory 604 is independently configured, the electronic device also includes a bus, which is configured to connect the memory 604 and the processor 603.

The present application also provides a computer readable storage medium, storing computer executable instructions which, when executed by a processor, implement the website intelligent interaction method executed by the website intelligent interaction device mentioned above.

Those of ordinary skill in the art can understand that all or some of the steps in methods, systems, and function modules/units in apparatuses disclosed above can be implemented as software, firmware, hardware, and an appropriate combination thereof. In a hardware implementation, the division between function modules/units mentioned in the above description does not necessarily correspond to the division of a physical component; for example, one physical component can have multiple functions, or one function or step can be executed collaboratively by several physical components. Some or all of physical components can be implemented as software executed by processors such as central processor, digital signal processor, or microprocessor, or be implemented as hardware, or be implemented as an integrated circuit such as application specific integrated circuit. Such software can be distributed on a computer readable medium, which can include a computer storage medium (or a non-transitory medium) and a communication medium (or a transitory medium). As is well known to those skilled in the art, the computer storage medium as a term includes volatile and non-volatile, removable and non-removable media implemented in any method or technology for storing information, such as computer readable instructions, data structures, program modules, or other data. The computer storage medium includes but is not limited to RAM, ROM, EEPROM, flash memory or other storage technology, CD-ROM, digital versatile disk (DVD) or other optical storage, magnetic cartridge, magnetic tape, magnetic disk storage or other magnetic storage apparatus, or any other media that can be used to store desired information and can be accessed by a computer. In addition, it is well known to those skilled in the art that the communication medium typically includes computer readable instructions, data structures, program modules, or other data in modulated data signals such as carriers or other transmission mechanisms, and may include any information delivery medium.

With the above, the technical solutions of the present application have been described in conjunction with the preferred embodiments shown in the accompanying drawings. However, it is easy for those skilled in the art to understand that the protection scope of the present application is not limited to these specific embodiments. The above embodiments are only used to illustrate the technical solutions of the present application, and not to limit them. Although the present application has been described in detail with reference to the aforementioned embodiments, those skilled in the art should understand that they can still modify the technical solutions described in the aforementioned embodiments, or equivalently replace some or all of the technical features therein; and these modifications or replacements do not make the essence of corresponding technical solutions deviate from the scope of the technical solutions of the various embodiments of the present application.

What is claimed is:

1. A construction method of an intelligent interaction service system, applied to an intelligent interaction engine platform, comprising:
    obtaining historical query information of a plurality of websites;
    obtaining website information of the plurality of websites and an intent identification corresponding to each historical query information;
    determining intent category and website association information corresponding to each historical query information according to the historical query information of the plurality of websites and the intent identification corresponding to each historical query information;
    inputting historical query information with the same complexity level of website information and the intent category and website association information corresponding to each historical query information into an intent recognition model corresponding to the complexity level of website information for training, to obtain a plurality of trained intent recognition models, and using the plurality of trained intent recognition models as an intent recognition component, wherein different complexity levels of website information correspond to different intent recognition models;
    performing an index extraction on the plurality of historical query information according to an index technology to obtain historical query information with an index structure;
    establishing an association relationship between the historical query information and the historical query information with the index structure; and
    performing an information retrieval training on the association relationship between the historical query information and the historical query information with the index structure according to a retrieval algorithm, to construct an information retrieval component;
    obtaining the plurality of website addresses and an access permission of each website address, and crawling website data corresponding to each website address;
    filtering first type of website data and second type of website data out from the website data corresponding to each website address, respectively;
    determining a website database corresponding to each website address according to the first type of website data corresponding to all website addresses and the second type of website data corresponding to each website address; and
    performing a feature extraction on website data corresponding to each website database, respectively, to construct vector database corresponding to each website address, and determining a vector database group according to a plurality of vector databases corresponding to the plurality of website addresses;
    constructing an intelligent interaction service system according to a user interaction interface, the intent recognition component, the information retrieval component, the vector database group and a generating model, wherein the generating model is used to generate a natural language response.

2. A website intelligent interaction method, used in the intelligent interaction service system obtained though the construction method according to claim 1, comprising:
    obtaining a user identity, and determining historical multimodal interaction data and a user type that are corresponding to the user identity;
    obtaining first modal interaction data sent by a user, and determining a user interaction mode according to the historical multimodal interaction data and the first modal interaction data, wherein the first modal interaction data is used to indicate first interaction data in current interaction data;
    performing an intent recognition analysis on current interaction data according to an intent recognition component to obtain a user intent label, and transforming the user intent label into a user intent vector; and
    performing a retrieve and match on the user intent vector based on a vector database group to obtain user interaction result information, and sending the user interaction result information corresponding to the user type to a human-computer interaction interface in the user interaction mode.

3. The method according to claim 2, wherein the determining the user interaction mode according to the historical multimodal interaction data and the first modal interaction data comprises:
    performing a feature analysis on the historical multimodal interaction data and the first modal interaction data to obtain a user interaction feature, and determining the user interaction mode according to the user interaction feature.

4. The method according to claim 3, wherein the historical multimodal interaction data comprises at least one of text data, image data, and audio data, and the performing the feature analysis on the historical multimodal interaction data and the first modal interaction data to obtain the user interaction feature, and determining the user interaction mode according to the user interaction feature comprises:
- if the first modal interaction data is the text data, determining, according to the user interaction feature, that the user interaction mode is a search box interaction mode containing a feature identification; and
- if the first modal interaction data is the image data or the audio data, matching a digital human role according to the user interaction feature, and determining that the user interaction mode is a digital human role interaction mode.

5. The method according to claim 4, wherein the matching the digital human role according to the user interaction feature comprises:
- obtaining digital human role labels corresponding to a plurality of types of digital humans;
- determining a digital human role label with a highest correlation to the user interaction feature according to a correlation between the user interaction feature and the digital human role labels; and
- determining that the user interacts with a digital human corresponding to the digital human role label with a highest correlation to the user interaction feature.

6. The method according to claim 2, wherein the performing the intent recognition analysis on the current interaction data according to the intent recognition component to obtain the user intent label comprises:
- obtaining a complexity level of website information corresponding to the current interaction data;
- determining a target intent recognition model according to the complexity level of website information corresponding to the current interaction data; and
- performing the intent recognition analysis on the current interaction data according to the target intent recognition model to obtain the user intent label.

7. The method according to claim 6, wherein the determining the target intent recognition model according to the complexity level of website information corresponding to the current interaction data comprises:
- if the complexity level of website information corresponding to the current interaction data is a simple task, determining that the target intent recognition model is a machine learning model; and
- if the complexity level of website information corresponding to the current interaction data is a complex task, determining that the target intent recognition model is a deep learning model.

8. The method according to claim 2, wherein the user interaction result information comprises: retrieval vector information and a response content, and the performing the retrieve and match on the user intent vector based on the vector database group to obtain the user interaction result information, and sending the user interaction result information corresponding to the user type to the human-computer interaction interface in the user interaction mode comprises:
- performing a correlation search in a target vector database through an information retrieval component according to the user intent vector to obtain a target intent vector corresponding to the user intent vector in the target vector database;
- determining the retrieval vector information and a target intent related link, which are corresponding to the target intent vector, according to the target vector database, wherein the target intent related link is used to indicate an information solution link of a plurality of websites associated with an target intent;
- inputting the retrieval vector information and the user intent vector into a generating model to obtain the response content; and
- sending the response content and the target intent related link, which are corresponding to the user type, to the human-computer interaction interface in the user interaction mode.

9. The method according to claim 8, wherein the inputting the retrieval vector information and the user intent vector into the generating model to obtain the response content comprises:
- performing a structural transformation on the retrieval vector information and the user intent vector to obtain retrieval information and a user intent; and
- performing an association analysis on the retrieval information with the user intent to obtain the response content.

10. A website intelligent interaction apparatus, used in the intelligent interaction service system obtained though the construction method according to claim 1, comprising:
- a memory; and
- a processor;
- wherein the memory stores computer executable instructions;
- the processor executes the computer executable instructions stored in the memory to:
- obtain a user identity;
- determine historical multimodal interaction data and a user type that are corresponding to the user identity;
- obtain first modal interaction data sent by a user;
- determine a user interaction mode according to the historical multimodal interaction data and the first modal interaction data, wherein the first modal interaction data is used to indicate first interaction data in current interaction data;
- perform an intent recognition analysis on current interaction data according to an intent recognition component to obtain a user intent label, and transform the user intent label into a user intent vector;
- perform a retrieve and match on the user intent vector based on a vector database group to obtain user interaction result information; and
- send the user interaction result information corresponding to the user type to a human-computer interaction interface in the user interaction mode.

11. The apparatus according to claim 10, wherein the processor is specifically configured to:
- perform a feature analysis on the historical multimodal interaction data and the first modal interaction data to obtain a user interaction feature, and determine the user interaction mode according to the user interaction feature.

12. The apparatus according to claim 11, wherein the historical multimodal interaction data comprises at least one of text data, image data, and audio data, and the performing the feature analysis on the historical multimodal interaction data and the first modal interaction data to obtain the user interaction feature, and the processor is specifically configured to:
- if the first modal interaction data is the text data, determine, according to the user interaction feature, that the user interaction mode is a search box interaction mode containing a feature identification; and if the first modal interaction data is the image data or the audio data, match a digital human role according to the user interaction feature, and determine that the user interaction mode is a digital human role interaction mode.

13. The apparatus according to claim 12, wherein the processor is specifically configured to:
   obtain digital human role labels corresponding to a plurality of types of digital humans;
   determine a digital human role label with a highest correlation to the user interaction feature according to a correlation between the user interaction feature and the digital human role labels; and
   determine that the user interacts with a digital human corresponding to the digital human role label with a highest correlation to the user interaction feature.

14. The apparatus according to claim 10, wherein the processor is specifically configured to:
   obtain a complexity level of website information corresponding to the current interaction data;
   determine a target intent recognition model according to the complexity level of website information corresponding to the current interaction data; and
   perform the intent recognition analysis on the current interaction data according to the target intent recognition model to obtain the user intent label.

15. The apparatus according to claim 14, wherein the processor is specifically configured to:
   if the complexity level of website information corresponding to the current interaction data is a simple task, determine that the target intent recognition model is a machine learning model; and
   if the complexity level of website information corresponding to the current interaction data is a complex task, determine that the target intent recognition model is a deep learning model.

16. The apparatus according to claim 10, wherein the user interaction result information comprises: retrieval vector information and a response content, and the processor is specifically configured to:
   perform a correlation search in a target vector database through an information retrieval component according to the user intent vector to obtain a target intent vector corresponding to the user intent vector in the target vector database;
   determine the retrieval vector information and a target intent related link, which are corresponding to the target intent vector, according to the target vector database, wherein the target intent related link is used to indicate an information solution link of a plurality of websites associated with an target intent;
   input the retrieval vector information and the user intent vector into a generating model to obtain the response content; and
   send the response content and the target intent related link, which are corresponding to the user type, to the human-computer interaction interface in the user interaction mode.

17. The apparatus according to claim 16, wherein the processor is specifically configured to:
   perform a structural transformation on the retrieval vector information and the user intent vector to obtain retrieval information and a user intent; and
   perform an association analysis on the retrieval information with the user intent to obtain the response content.

18. A non-transitory computer storage medium, storing computer executable instructions which, when executed by a processor, implement the following steps:
   obtaining a user identity, and determining historical multimodal interaction data and a user type that are corresponding to the user identity;
   obtaining first modal interaction data sent by a user, and determining a user interaction mode according to the historical multimodal interaction data and the first modal interaction data, wherein the first modal interaction data is used to indicate first interaction data in current interaction data;
   performing an intent recognition analysis on current interaction data according to an intent recognition component to obtain a user intent label, and transforming the user intent label into a user intent vector; and
   performing a retrieve and match on the user intent vector based on a vector database group to obtain user interaction result information, and sending the user interaction result information corresponding to the user type to a human-computer interaction interface in the user interaction mode.

19. The non-transitory computer storage medium according to claim 18, wherein when executed by the processor, the computer executable instructions specifically implement the following steps:
   performing a feature analysis on the historical multimodal interaction data and the first modal interaction data to obtain a user interaction feature, and determining the user interaction mode according to the user interaction feature.

20. The non-transitory computer storage medium according to claim 19, wherein the historical multimodal interaction data comprises at least one of text data, image data, and audio data, and when executed by the processor, and the computer executable instructions specifically implement the following steps:
   if the first modal interaction data is the text data, determining, according to the user interaction feature, that the user interaction mode is a search box interaction mode containing a feature identification; and
   if the first modal interaction data is the image data or the audio data, matching a digital human role according to the user interaction feature, and determining that the user interaction mode is a digital human role interaction mode.

* * * * *